April 26, 1927.
C. E. STEIN
BUMPER
Filed July 26, 1926
1,626,566
2 Sheets-Sheet 1
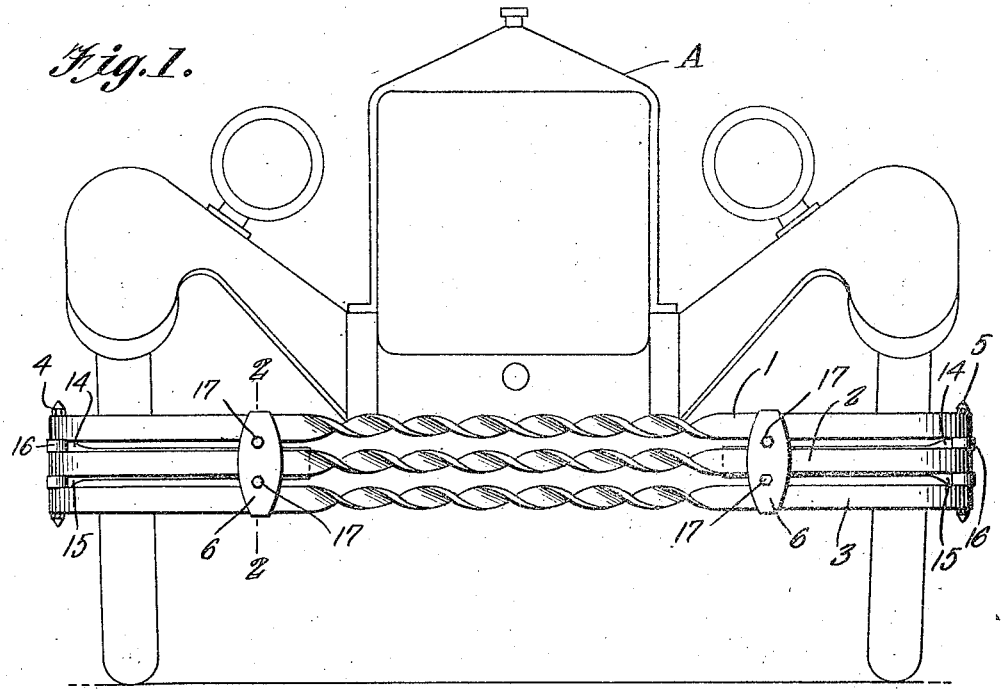
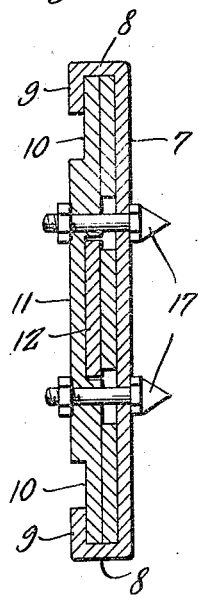
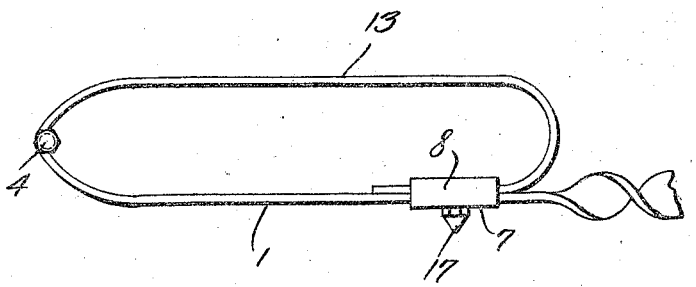
Charles E. Stein,
INVENTOR
BY Victor J. Evans
ATTORNEY
WITNESS: P. T. Hickey.

April 26, 1927.  C. E. STEIN  1,626,566
BUMPER
Filed July 26, 1926    2 Sheets-Sheet 2

Charles E. Stein,
INVENTOR
BY Victor J. Evans
ATTORNEY

WITNESS:

Patented Apr. 26, 1927.

1,626,566

UNITED STATES PATENT OFFICE.

CHARLES EDWARD STEIN, OF BREA, CALIFORNIA.

BUMPER.

Application filed July 26, 1926. Serial No. 125,031.

This invention relates to bumpers for vehicles and its primary object is to provide a bumper of the spring type and one which possesses great strength as well as adds materially to the ornamental appearance of the vehicle to which the bumper is attached.

Another object of the invention is to provide a bumper which not only possesses great strength at its striking portions, but is so formed to eliminate or reduce damage to a minimum, regardless of the force of impact with an obstructing object.

This invention also consists of certain other features of construction and in the combination and arrangement of the several parts, to be hereinafter fully described, illustrated in the accompanying drawings, and specifically pointed out in the appended claims.

In describing my invention in detail, reference will be had to the accompanying drawings, wherein like characters denote like or corresponding parts throughout the several views, and in which:

Figure 1 is a front elevation of a motor vehicle, showing one form of my novel bumper associated therewith.

Figure 2 is a sectional view taken on line 2—2 of Figure 1.

Figure 3 is a top plan view of a fragmentary portion of the bumper shown in Figure 1.

Figure 4:
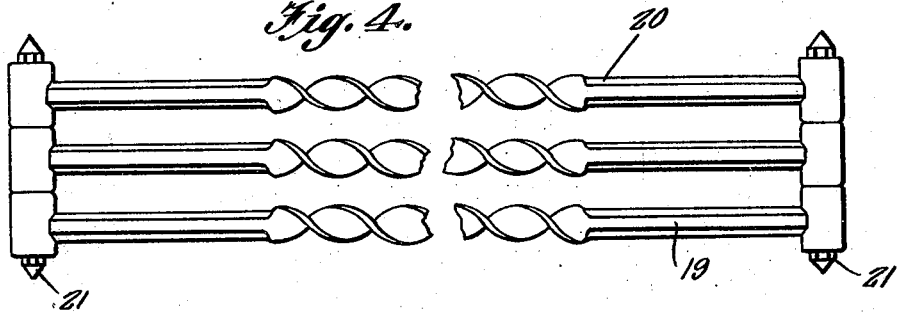
Figure 4 is a front elevation of a modified form of bumper.

Referring to the drawings in detail, the letter A indicates the front of a motor vehicle which has one form of the bumper which forms the subject matter of the present invention associated therewith, and it will be obvious that either form of the bumper as shown in the drawings can be secured to the front or the rear of the vehicle, without departing from the spirit of the invention.

The bars of the form of bumper as shown in Figures 1 to 3, inclusive, are indicated by the reference numerals 1, 2 and 3, respectively, and are arranged in edge to edge superimposed relation, with the ends thereof curved slightly rearwardly and terminating in bearings which surround the bolts 4 and 5 in spaced relation with respect to each other. The bolts 4 and 5 are provided with suitable nuts (not shown).

The central portion of each bar 1, 2 and 3 is twisted in auger formation to add materially to the strength thereof, without departing from the resiliency of the bars, and arranged upon opposite sides of the twisted portions of the bars are clamps 6 which include front plates 7 having their upper ends bent upon themselves to provide hook flanges 8 including confronting ends 9 which engage the recessed end portions 10 of the rear plates 11, as shown in Figure 2. The rear plates 11 are centrally recessed as at 12 to accommodate one end of the curved strips 13 which have their opposite ends bifurcated to provide arms 14 and 15 having their ends carried upon themselves to form bearings 16 which are secured to the bolts 3 and 4 between the bearings of the bars and provide spacers therefor, as shown in Figure 1. The respective plates of the clamps are secured together by bolt and nut connections 17. The strips 13 are adapted to be secured to the frame of the vehicle by suitable brackets (not shown).

In the modified form, as shown in Figure 4, the bars 19 also have their intermediate portions twisted into auger formation and the longitudinal edges of the bars 19 upon opposite sides of the twisted portions thereof are bent in confronting relation as at 20, while the ends of the bars 19 are integrally formed with enlarged bearings through which pass the bolts 21 provided with suitable heads as shown.

Figure 5:
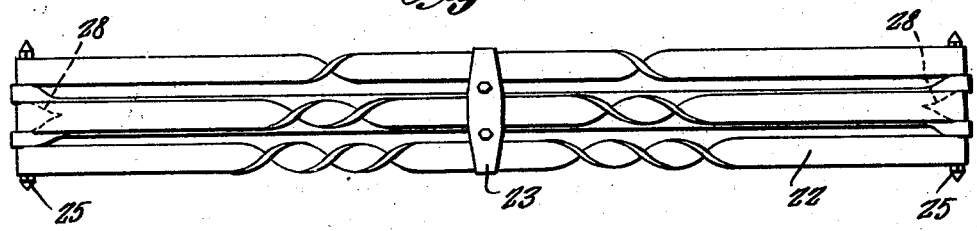
Figure 5 is a similar view of another modified form.
Figure 6:
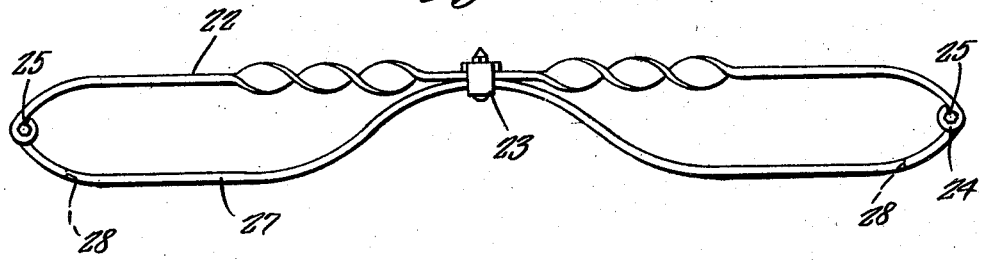
Figure 6 is a top plan view of the modified form as shown in Figure 5.

In the modified form, as shown in Figures 5 and 6, the bars 22 are clamped together in the same manner as the bars 1, 2 and 3 in the form first described, but in this instance a single clamp 23 similar to clamp 6 is used and is disposed between the twisted portions of the bars 22 and centrally of the respective bars, as clearly shown in Figure 5 of the drawings. The upper bar of the bars 22 is provided at each end of the clamp with a single twist, the middle bar with a double twist, and the lower bar with a triple twist. The ends of the bars 22 are curved upon themselves to provide the bearings 24 surrounding the bolts 25, as shown in Figure 6, and the rear bar 27 is formed with bifurcated ends to provide arms 28 which have their ends curved upon themselves to form bearings surrounding the bolts 25 and provide spacers for the bearings 24 of the bars 22.

The intermediate portion of the bar 27 is curved to be received between the plates of the clamp 23, so as to adequately brace this bar 27.

Suitable brackets may be employed for securing the bumpers, as shown in Figures 4 to 6, inclusive, to a motor vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention, what is claimed is:

1. A bumper of the character described, comprising spaced superimposed bars having portions twisted into auger form.

2. A bumper of the character described, comprising bars having portions thereof twisted into auger form, said bars having their ends bent upon themselves to provide bearings, and means passing through said bearings for retaining and securing said bars in superimposed relation.

3. A bumper of the character described, comprising bars arranged in superimposed relation, and having portions twisted into auger formation, clamps for retaining said bars in said superimposed relation and including front plates having flanged ends, recessed rear plates having recessed ends for receiving the flanged ends, bolts for securing said plates in cooperative position about said bars, strips having one of their ends curved upon themselves and clamped in the recess of the rear plate of the clamps, bearings formed on the ends of said bars and the strips, respectively, and bolts passing through said bearings.

4. A bumper of the character described, comprising bars arranged in superimposed relation, twisted portions formed in each bar, bearings formed on the ends of said bars, means for clamping said bars in their superimposed relation, means passing through the bearings for securing the bars in cooperative position, bifurcated means having bearings formed on the arms of the bifurcated portions thereof and disposed between the bearings of the bars to provide spacers therefor, and said means being clamped in the clamping means.

In testimony whereof I affix my signature.

CHARLES EDWARD STEIN.